US010677259B2

(12) United States Patent
Jain et al.

(10) Patent No.: US 10,677,259 B2
(45) Date of Patent: Jun. 9, 2020

(54) APPARATUS AND SYSTEM FOR COMPOSITE FAN BLADE WITH FUSED METAL LEAD EDGE

(71) Applicant: General Electric Company, Schenectady, NY (US)

(72) Inventors: Nitesh Jain, Karnataka (IN); Vikulp Sharma, Karnataka (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 593 days.

(21) Appl. No.: 15/148,631

(22) Filed: May 6, 2016

(65) Prior Publication Data
US 2017/0321714 A1    Nov. 9, 2017

(51) Int. Cl.
F04D 29/38 (2006.01)
F01D 21/04 (2006.01)
(Continued)

(52) U.S. Cl.
CPC .......... F04D 29/388 (2013.01); F01D 5/147 (2013.01); F01D 21/045 (2013.01);
(Continued)

(58) Field of Classification Search
CPC .... F04D 29/388; F04D 29/325; F04D 29/023; F04D 29/324; F04D 29/526;
(Continued)

(56) References Cited

U.S. PATENT DOCUMENTS 4,022,540 A    5/1977 Young
4,111,600 A    9/1978 Rothman et al.
(Continued)

FOREIGN PATENT DOCUMENTS

EP    0526057 A1    2/1993
EP    0863073 A2    9/1998
(Continued)

OTHER PUBLICATIONS

International Search Report and Written Opinion issued in connection with corresponding PCT Application No. PCT/US2017/26970 dated Jul. 12, 2017.
(Continued)

Primary Examiner — Dwayne J White
Assistant Examiner — Adam W Brown
(74) Attorney, Agent, or Firm — General Electric; Kristi Davidson

(57) ABSTRACT

A metal leading edge includes a nose positioned along the leading edge of a fan blade airfoil body. The metal leading edge also includes a first edge extending axially aftward from the nose along a pressure side of the fan blade airfoil body. The metal leading edge further includes a second edge extending axially aftward from the nose along a suction side of the fan blade airfoil body. The first edge and the second edge forming a notch at the conjunction of the first edge, the second edge, and the nose. The metal leading edge also includes a nose length extending from a nose tip to the notch. The nose length at a first radial location is different from the nose length at a second radial location.

15 Claims, 6 Drawing Sheets

(51) Int. Cl.
  *F04D 29/32* (2006.01)
  *F01D 5/14* (2006.01)
  *F04D 29/02* (2006.01)
  *F04D 29/52* (2006.01)

(52) U.S. Cl.
  CPC ......... *F04D 29/023* (2013.01); *F04D 29/324* (2013.01); *F04D 29/325* (2013.01); *F04D 29/526* (2013.01); *F05D 2220/36* (2013.01); *F05D 2240/303* (2013.01); *Y02T 50/672* (2013.01); *Y02T 50/673* (2013.01)

(58) Field of Classification Search
  CPC ...... F01D 21/045; F01D 5/147; Y02T 50/672; Y02T 50/673; F05D 2240/303; F05D 2220/36
  See application file for complete search history.

(56) References Cited

U.S. PATENT DOCUMENTS

| | | | |
|---|---|---|---|
| 4,971,641 | A | 11/1990 | Nelson et al. |
| 5,112,194 | A | 5/1992 | More |
| 5,123,813 | A | 6/1992 | Przytulski et al. |
| 5,127,802 | A | 7/1992 | Carlson et al. |
| 5,129,787 | A | 7/1992 | Violette et al. |
| 5,141,400 | A | 8/1992 | Murphy et al. |
| 5,222,297 | A | 6/1993 | Graff et al. |
| 5,269,658 | A | 12/1993 | Carlson et al. |
| 5,279,892 | A | 1/1994 | Baldwin et al. |
| 5,340,280 | A | 8/1994 | Schilling |
| 5,375,978 | A | 12/1994 | Evans et al. |
| 5,392,514 | A | 2/1995 | Cook et al. |
| 5,449,273 | A | 9/1995 | Hertel et al. |
| 5,486,096 | A | 1/1996 | Hertel et al. |
| 5,520,532 | A | 5/1996 | Reinfelder et al. |
| 5,573,377 | A | 11/1996 | Bond et al. |
| 5,580,217 | A | 12/1996 | Richards et al. |
| 5,785,498 | A | 7/1998 | Quinn et al. |
| 5,836,744 | A | 11/1998 | Zipps et al. |
| 5,843,354 | A | 12/1998 | Evans et al. |
| 5,844,669 | A | 12/1998 | Wang et al. |
| 5,908,285 | A | 6/1999 | Graff |
| 5,935,360 | A | 8/1999 | Griggs |
| 5,939,006 | A | 8/1999 | Wang et al. |
| 6,041,132 | A | 3/2000 | Isaacs et al. |
| 6,290,466 | B1 | 9/2001 | Ravenhall et al. |
| 6,290,895 | B1 | 9/2001 | Wang et al. |
| 6,294,113 | B1 | 9/2001 | Woodmansee et al. |
| 6,413,051 | B1 | 7/2002 | Chou et al. |
| 6,607,358 | B2 | 8/2003 | Finn et al. |
| 6,843,565 | B2 | 1/2005 | Evans et al. |
| 7,507,309 | B2 | 3/2009 | Manicke et al. |
| 7,507,310 | B2 | 3/2009 | Manicke et al. |
| 7,547,194 | B2 | 6/2009 | Schilling |
| 7,575,417 | B2 | 8/2009 | Finn et al. |
| 7,736,130 | B2 | 6/2010 | Schilling et al. |
| 7,780,410 | B2 * | 8/2010 | Kray ....................... B23P 15/04 415/9 |
| 7,837,446 | B2 | 11/2010 | McMillan |
| 8,038,408 | B2 | 10/2011 | McMillan et al. |
| 8,100,662 | B2 | 1/2012 | Schreiber |
| 8,109,734 | B2 | 2/2012 | Backhouse |
| 8,146,250 | B2 | 4/2012 | Moroso |
| 8,251,640 | B2 | 8/2012 | Beckford et al. |
| 8,459,955 | B2 * | 6/2013 | McMillan ................ F01D 5/282 29/889.7 |
| 8,573,936 | B2 | 11/2013 | Lafont et al. |
| 8,858,182 | B2 * | 10/2014 | Schwarz ................... F01D 5/28 416/224 |
| 9,157,327 | B2 * | 10/2015 | Deal ........................ F01D 5/147 |
| 10,030,522 | B2 * | 7/2018 | Benson ................... F01D 5/147 |
| 10,066,490 | B2 * | 9/2018 | Yagi ...................... F04D 29/023 |
| 2009/0269203 | A1 | 10/2009 | Care et al. |
| 2010/0150707 | A1 | 6/2010 | Jevons |
| 2010/0290913 | A1 | 11/2010 | Carvalho |
| 2010/0296942 | A1 | 11/2010 | Jevons |
| 2011/0023301 | A1 | 2/2011 | Jones |
| 2011/0027096 | A1 | 2/2011 | Northfield |
| 2011/0033292 | A1 | 2/2011 | Huth |
| 2011/0049297 | A1 | 3/2011 | Jevons et al. |
| 2011/0052405 | A1 | 3/2011 | Parkin |
| 2011/0097213 | A1 | 4/2011 | Peretti et al. |
| 2011/0129348 | A1 | 6/2011 | Parkin et al. |
| 2011/0129351 | A1 | 6/2011 | Das et al. |
| 2011/0176927 | A1 | 7/2011 | Alexander et al. |
| 2011/0182740 | A1 | 7/2011 | Klinetob et al. |
| 2011/0182741 | A1 | 7/2011 | Alexander |
| 2011/0182743 | A1 | 7/2011 | Naik |
| 2011/0194941 | A1 | 8/2011 | Parkin et al. |
| 2011/0217160 | A1 | 9/2011 | McMillan |
| 2011/0217166 | A1 | 9/2011 | McMillan |
| 2011/0223027 | A1 | 9/2011 | Klinetob et al. |
| 2011/0229334 | A1 | 9/2011 | Alexander |
| 2012/0003100 | A1 | 1/2012 | James et al. |
| 2012/0021243 | A1 | 1/2012 | Kray et al. |
| 2012/0028055 | A1 | 2/2012 | Schmidt |
| 2012/0034089 | A1 | 2/2012 | Wadewitz et al. |
| 2012/0051935 | A1 | 3/2012 | Naik et al. |
| 2012/0082556 | A1 | 4/2012 | Macchia et al. |
| 2012/0082559 | A1 | 4/2012 | Guglielmin et al. |
| 2012/0100006 | A1 | 4/2012 | Merriman et al. |
| 2013/0276455 | A1 | 10/2013 | Fisk et al. |
| 2015/0218953 | A1 | 8/2015 | Bottome |
| 2015/0377030 | A1 * | 12/2015 | Murdock ................ F01D 5/147 416/224 |

FOREIGN PATENT DOCUMENTS

| | | |
|---|---|---|
| EP | 1752610 A2 | 2/2007 |
| EP | 2 159 378 A2 | 3/2010 |
| EP | 1920895 B1 | 10/2010 |
| EP | 2236235 A1 | 10/2010 |
| EP | 2458153 A2 | 5/2012 |
| EP | 2 540 974 A2 | 1/2013 |
| EP | 2905424 A1 | 1/2015 |
| FR | 2 994 708 A1 | 2/2014 |
| GB | 2450139 A | 12/2008 |
| GB | 2484726 A | 4/2012 |
| JP | H04232400 A | 8/1992 |
| WO | 2008122751 A2 | 10/2008 |
| WO | 2010014342 A1 | 2/2010 |
| WO | 2010014343 A1 | 2/2010 |

OTHER PUBLICATIONS

Ebay—Vintage Sensenich Bros. Wood Propeller Blade, Sensenich decal, mark c1940—http://www.ebay.com/itm/like/182066969066?lpid=82&chn=ps&ul_noapp=true—Apr. 6, 2016 (Date Accessed).
Ebay—Fine Antique Sensenich Wood Propeller With Wonderful Patina WWII Era—http://www.ebay.com/itm/Fine-Antique-Sensenich-Wood-Propeller-With-Wonderful-Patina-WWII-Era/262342178457?_trksid=p2141725.c100338.m3726&_trkparms=aid%3D222007%26algo%3DSIC.MBE%26ao%3D1%26asc%3D20150313114020%26meid%3D581163982c344ccbaf8efdee7dd4d70d%26pid%3D100338%26rk%3D5%26rkt%3D11%26sd%3D182066969066—Apr. 6, 2016 (Date accessed).
Sensenich—http://www.sensenich.com/—Apr. 6, 2016 (Date accessed).
Univair—http://www.univair.com/categories/propellers/sensenich/wood-propellers.html—Apr. 6, 2016 (Date accessed).
Youtube—https://www.youtube.com/watch?v=ax0yaHi4acc—Apr. 6, 2016 (Date accessed).
Ebay—http://www.ebay.com/bhp/sensenich-propeller—Apr. 6, 2016 (Date accessed).
Aircraft Spruce—http://www.aircraftspruce.com/menus/ap/prop_1brand_sensenich.html—Apr. 6, 2016 (Date accessed).
Wikipedia—https://en.wikipedia.org/wiki/Sensenich_Propeller—Apr. 6, 2016 (Date accessed).
Propellerman—http://www.propellerman.com/—Apr. 6, 2016 (Date accessed).

(56) References Cited

OTHER PUBLICATIONS

Amazon—http://www.amazon.com/s/?ie=UTF8&keywords=car+door+edge+guards&tag=googhydr-20&index=aps&hvadid=31914483570&hvpos=1t1&hvexid=&hvnetw=g&hvrand=5438148997360534104&hvptwo=&hvqmt=b&hvdev=c&ref=pd_sl_7hej9k07p1_b—Apr. 6, 2016 (Date accessed).
Amazon—http://www.amazon.com/Smart-Chrome-Molding-Models-D-I-Y/dp/B004QY9O9Y—Apr. 6, 2016 (Date accessed).
Autozone—http://www.autozone.com/decals-and-graphics/door-edge-molding—Apr. 6, 2016 (Date accessed).
Cowles Products—http://cowlesproducts.com/oldcontent/wp/protektotrim/door-edge-guards/—Apr. 6, 2016 (Date accessed).
Cowles Products—http://cowlesproducts.com/oldcontent/wp/how-to-choose-door-edge-guards/—Apr. 6, 2016 (Date accessed).
O'Reilly Auto Parts—http://www.oreillyauto.com/site/c/search/Door+Edge+Guard+(Universal)/N2393/C0325.oap—Apr. 6, 2016 (Date accessed).
Youtube—https://www.youtube.com/watch?v=ROV87CzpfBA—Apr. 6, 2016 (Date accessed).
Ebay—http://www.ebay.com/bhp/car-door-edge-guards—Apr. 6, 2016 (Date accessed).
Ebay—http://www.ebay.com/bhp/chrome-door-trim—Apr. 6, 2016 (Date accessed).
Brandsport—http://www.brandsport.com/trmg-2105-c.html—Apr. 6, 2016 (Date accessed).
Brandsport—http://www.brandsport.com/trimgard1.html—Apr. 6, 2016 (Date accessed).
No Dings—http://www.nodoordings.com/—Apr. 6, 2016 (Date accessed).
Auto Truck Toys—http://www.autotrucktoys.com/accessories/Cowles-Door-Edge-Guards-PRD35511.aspx?gclid=CP6J_JTTw8wCFYGFaQodzrMIqA—Apr. 6, 2016 (Date accessed).
Norman International—http://www.normaninternational.com/group2.html—Apr. 6, 2016 (Date accessed).

* cited by examiner

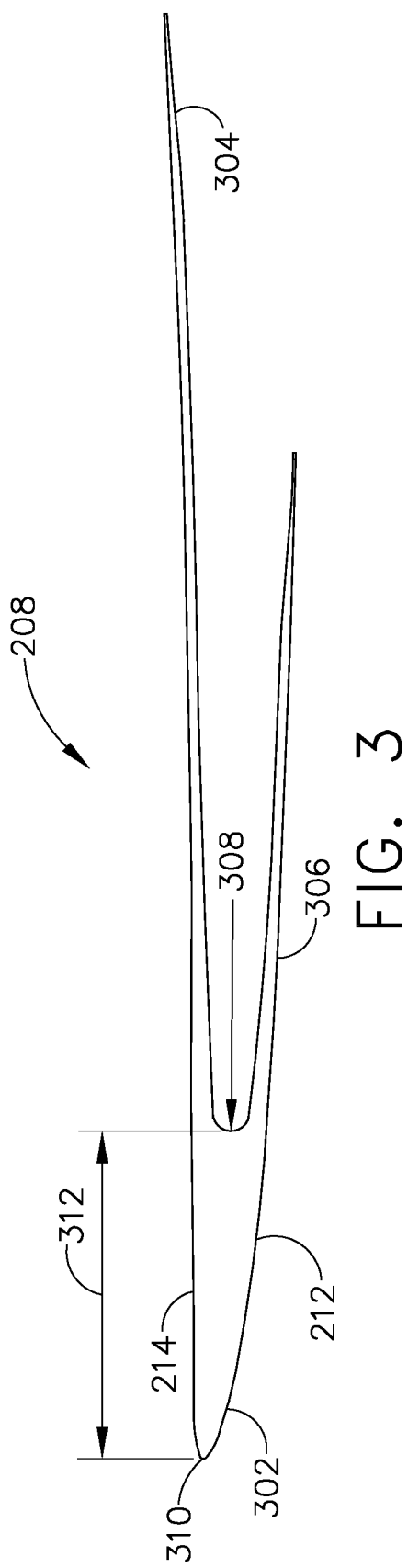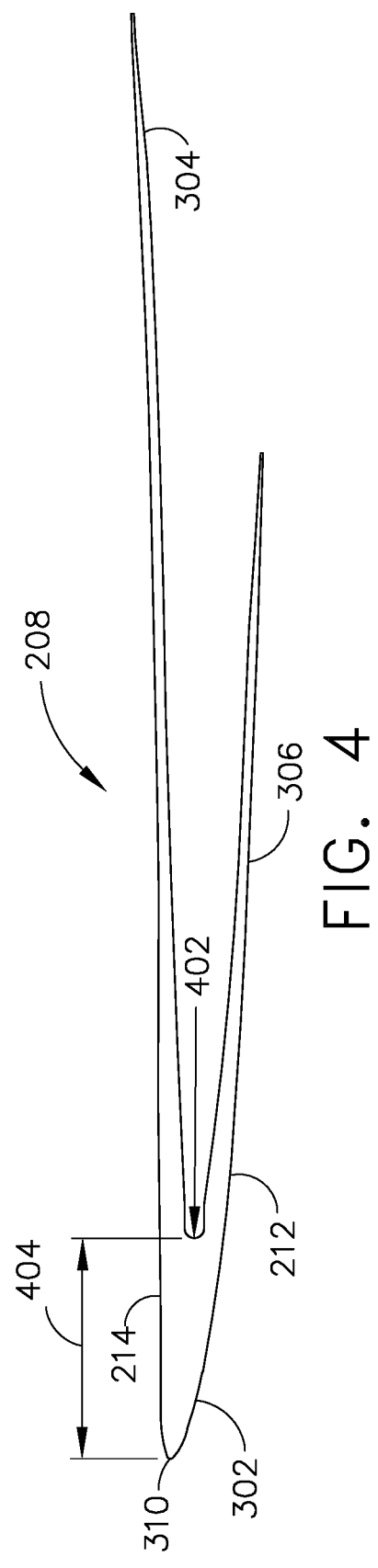

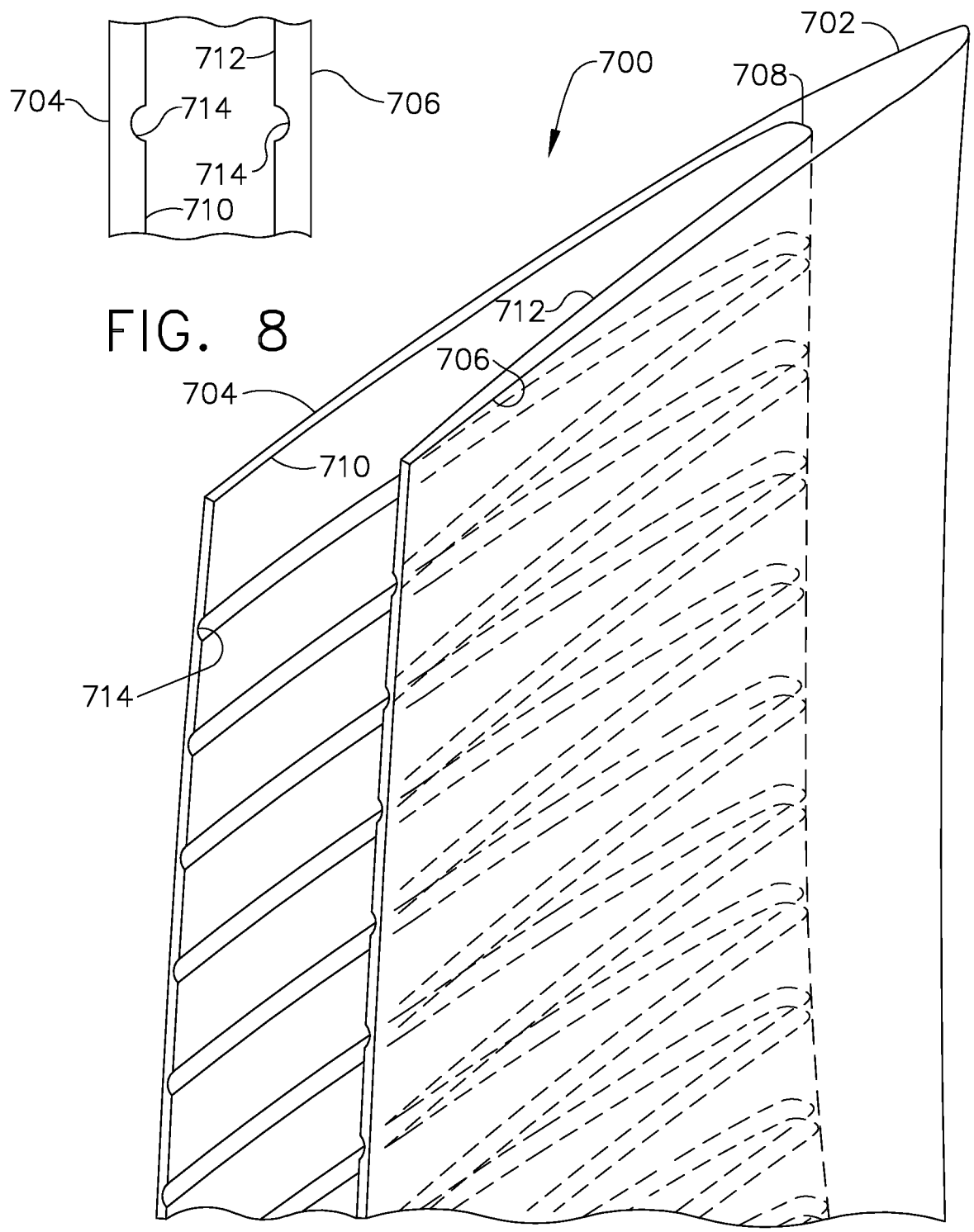

APPARATUS AND SYSTEM FOR COMPOSITE FAN BLADE WITH FUSED METAL LEAD EDGE

BACKGROUND

The field of the disclosure relates generally to apparatuses and systems for fan blades in aviation engines and, more particularly, to an apparatus and system for a composite fan blade with a fused metal lead edge in aviation engines.

Aircraft engines typically include a fan assembly which directs air to a bypass duct, a low pressure compressor, and a core engine. A blade fan out event occurs when a fan blade breaks loose from the fan assembly and impacts some part of the engine. A nacelle or containment case may enclose the fan and is configured to contain the liberated fan blade during a fan blade out event. The fan assembly includes a fan hub that supports a plurality of circumferentially spaced fan blades. At least some known fan blades are fabricated from a composite material. To strengthen the composite material, to minimize danger to the fan blades during a fan blade out event, and protect the fan blades from foreign object damage, a metal leading edge may be used with the fan blade. In an event where a fan blade or a portion of a fan blade is liberated from the hub, the metal leading edge can damage the engine or containment casing. A stronger metal leading edge may necessitate a stronger containment casing, increasing the weight of the aircraft engine.

BRIEF DESCRIPTION

In one aspect, a metal leading edge is provided. A metal leading edge includes a nose positioned along the leading edge of a fan blade airfoil body. The metal leading edge also includes a first edge extending axially aftward from the nose along a pressure side of the fan blade airfoil body. The metal leading edge further includes a second edge extending axially aftward from the nose along a suction side of the fan blade airfoil body. The first edge and the second edge forming a notch at the conjunction of the first edge, the second edge, and the nose. The metal leading edge also includes a nose length extending from a nose tip to the notch. The nose length at a first radial location is different from the nose length at a second radial location.

In another aspect, a fan blade assembly is provided. A fan blade assembly includes a fan blade airfoil body. The fan blade assembly also includes a metal leading edge including a nose positioned along the leading edge of the fan blade airfoil body. The metal leading edge also includes a first edge extending axially aftward from the nose along a pressure side of the fan blade airfoil body. The metal leading edge further includes a second edge extending axially aftward from the nose along a suction side of the fan blade airfoil body. The first edge and the second edge forming a notch at the conjunction of the first edge, the second edge, and the nose. The first edge and the second edge comprise a plurality of weakening structures.

In yet another aspect, a fan blade is provided. A fan blade including a fan blade body including a fan blade root, a fan blade tip, and an airfoil body extending axially therebetween. The airfoil body includes an axially-spaced leading edge and an axially-spaced trailing edge. The fan blade also includes a metal leading edge including a nose positioned adjacent the leading edge of the fan blade. The nose includes a nose tip. The metal leading edge also includes a first edge extending axially aftward from the nose along a pressure side of the airfoil body toward the trailing edge of the fan blade. The metal leading edge further includes a second edge extending axially aftward from the nose along a suction side of the fan blade toward the trailing edge of the fan blade. The first edge and the second edge forming a notch at the conjunction of the first edge, the second edge, and the nose. The metal leading edge also includes a nose length extending from the nose tip to the notch. The nose length at a first radial location is different from the nose length at a second radial location.

DRAWINGS

These and other features, aspects, and advantages of the present disclosure will become better understood when the following detailed description is read with reference to the accompanying drawings in which like characters represent like parts throughout the drawings, wherein:

FIGS. 1-8 show example embodiments of the method and apparatus described herein.

FIG. 1 is a schematic view of an exemplary gas turbine engine.

FIG. 2 is a perspective view of a fan blade that is used with the gas turbine engine shown in FIG. 1.

FIG. 3 is a cutaway view of a metal leading edge at a non-fail-fused location.

FIG. 4 is a cutaway view of a metal leading edge at a fail-fused location.

FIG. 5 is a perspective view of a notched metal leading edge.

FIG. 6 is a perspective view of a metal leading edge with holes.

FIG. 7 is a perspective view of a metal leading edge with a weakened inner pressure and suction side bond edge.

FIG. 8 is a partial end view of a metal leading edge with a weakened inner pressure and suction side bond edge.

Figure 1:
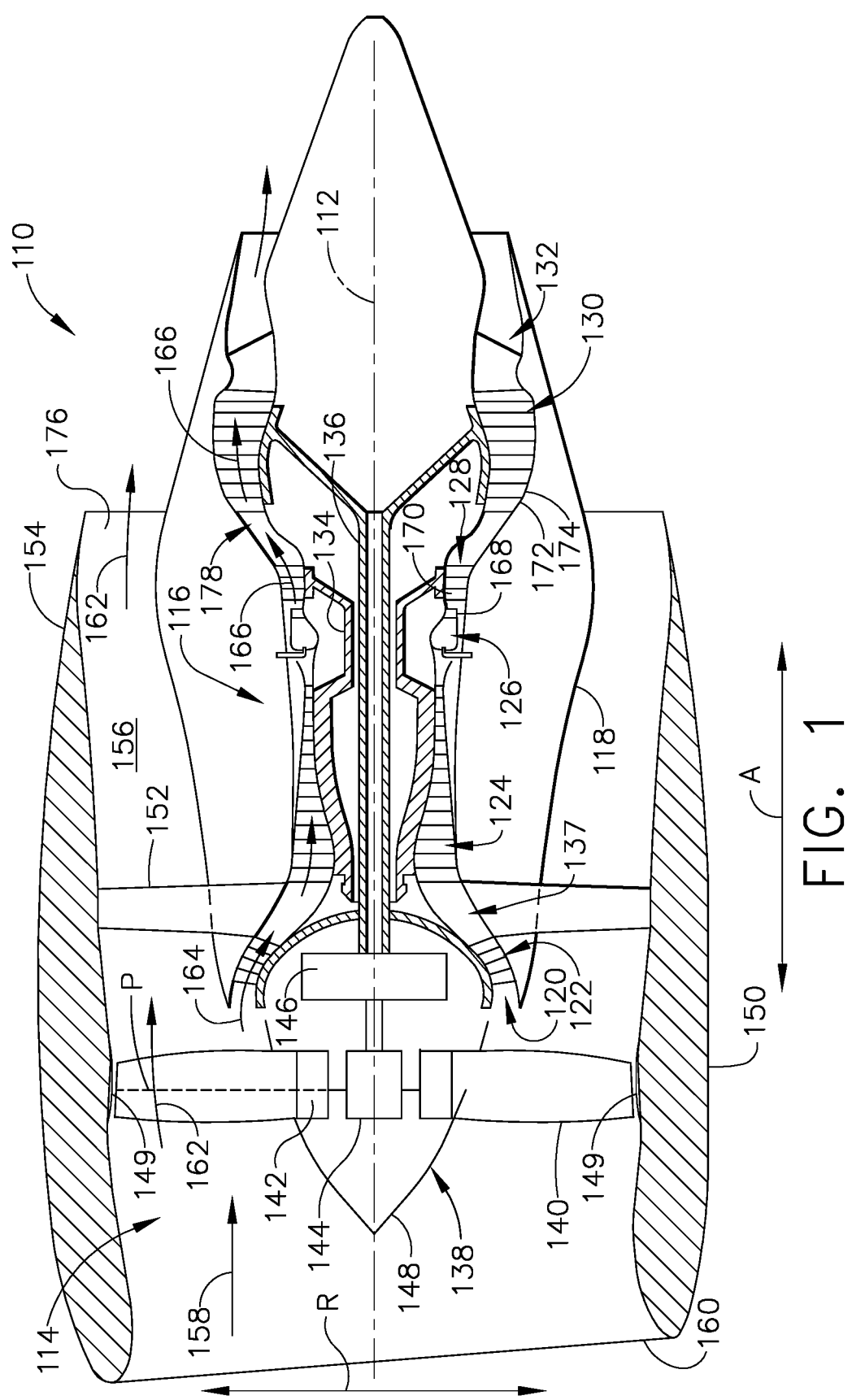

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the metal leading edge described herein allow the metal leading edge to break apart during fan blade out events. The metal leading edge includes a nose, a pressure side edge, a suction side edge, and a notch. The nose extends from the leading edge of a fan blade. The pressure side edge and the suction side edge extend from the nose along the body of the fan blade. The notch is formed from the conjunction of the nose, the pressure side edge, and the suction side edge. The notch is adhesively bonded to the fan blade. A nose length extends from the tip of the nose to the notch. Each embodiment of the metal leading edge includes a weakening structure which weakens the metal leading edge allowing it to break during extreme loading conditions, such as a fan blade out event, reducing the damage to fan case. In a first embodiment, the metal leading edge is milled to vary the nose length at different radial positions along the metal leading edge. Radial positions where the nose length is shorter weaken the nose and the metal leading edge, allowing it to break under extreme loading conditions. In a second embodiment, the pressure side edge and the suction side edge include a plurality of notches which weaken the structure of the metal leading edge, allowing it to break under extreme loading conditions. In a third embodiment, the pressure side edge and the suction side edge include a plurality of holes which weaken the structure of the metal leading edge, allowing it to break under extreme loading conditions.

The metal leading edge described herein offers advantages over known metal leading edges in aircraft engines. More specifically, the metal leading edge described herein breaks as resultant of extreme loading conditions. Aviation regulations require either the nacelle or containment case to prevent the fan blade from flying into the fuselage of the aircraft during a fan blade out event. The armoring of the nacelle or containment case must be strong enough to contain the fan blades during fan blade out events. A stronger fan blade requires stronger and heavier armoring of the nacelle or containment case which increases the weight of the aircraft engine. The metal leading edge described herein is weakened to break during a fan blade out event. A weaker metal leading edge reduces the armoring of the nacelle or containment case, reducing the weight of the engine. Additionally, a weaker metal leading edge reduces damage to trailing fans during a fan blade out event. Furthermore, metal leading edge described herein reduces fan blade out loads and unbalance.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

Also, in the exemplary embodiment, disk 142 is covered by rotatable front hub 148 aerodynamically contoured to promote an airflow through plurality of fan blades 140. Additionally, exemplary fan section 114 includes an annular fan casing 149 and an outer nacelle 150 that circumferentially surrounds fan 138 and/or at least a portion of core turbine engine 116. Fan casing 149 includes an armored annular casing circumscribing fan section 114 and disposed within Nacelle 150. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate which causes power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

During a fan blade out event, a fan blade of the plurality of fan blades 140 breaks loose from disk 142 and flies into nacelle 150, fan casing 149, other fan blades 140, and other parts of gas turbine engine 110. Fan casing 149 is armored to prevent a loose fan blade 140 from impacting the fuselage of the aircraft. Stronger fan blades 140 require heavier armoring for fan casing 149. Exemplary embodiments of fan blades 140 described herein are designed to break apart during extreme loading conditions, such as a fan blade out event, reducing the damage to fan casing 149, nacelle 150, other fan blades 140, and other parts of gas turbine engine 110. Accordingly, the armoring of fan casing 149 can be reduced which reduces the weight of gas turbine engine 110.

Exemplary turbofan engine 110 depicted in FIG. 1 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 2:
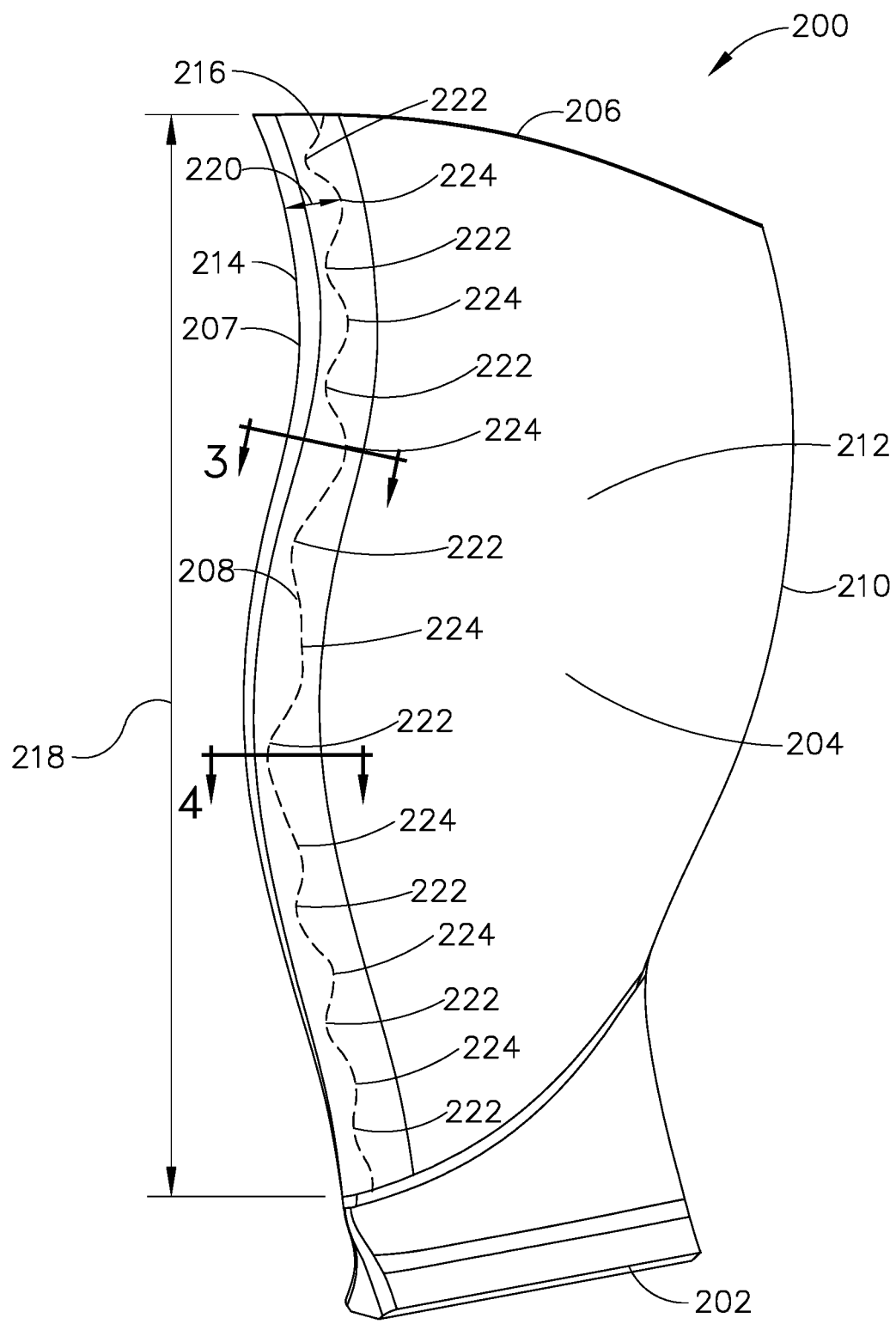

FIG. 2 is a perspective view of a fan blade 200 in accordance with an exemplary embodiment of the present disclosure. Fan blade 200 includes a fan blade root 202, a fan blade body 204, a fan blade tip 206, a leading edge 207, a metal leading edge 208, and a trailing edge 210. Fan blade root 202 is operatively coupled to pitch change mechanism 144 configured to vary the pitch of fan blade 200. Fan blade body 204 extends from fan blade root 202 in radial direction R to fan blade tip 206. Fan blade body 204 includes an airfoil shaped blade metallic or composite blade. Fan blade body 204 and metal leading edge 208 include a suction side 212 and a pressure side 214. Trailing edge 210 extends from fan blade body 204 in the opposite direction of rotation of fan blade 200. Leading edge 207 extends from fan blade body 204 in the direction of rotation of fan blade 200. Metal leading edge 208 is adhesively bonded to fan blade body 204 and wraps partially around leading edge 207 forming a notch 216 (shown as a dashed line in FIG. 2) at the intersection of the suction side 212 and pressure side 214 of fan blade body 204 and the interior portion of metal leading edge 208. Notch 216 extends along a length 218 of metal leading edge 208 and includes a nose length 220 extending from leading edge 207 to notch 216. Metal leading edge 208 may be composed of composite materials or metallic materials such as, but not limited to, titanium or steel.

Metal leading edge 208 includes a plurality of fail-fuse points 222 located periodically along length 218 of metal leading edge 208 and sized in a predetermined direction to break during extreme loading conditions, such as a fan blade out event, reducing the damage to fan case 149. Metal leading edge 208 also includes a plurality of non-fail-fused points 224 located periodically along length 218 of metal leading edge 208 and sized not to break during extreme loading conditions, such as a fan blade out event. The nose lengths 220 of fail-fused points 222 are shorter than the nose lengths 220 of non-fail-fuse points 224. The shorter nose lengths of fail-fuse points 222 weakens fail-fuse points 222 increasing the likelihood that metal leading edge 208 will break at those locations during extreme loading conditions, such as a fan blade out event. In an exemplary embodiment, nose length 220 can vary by length 218 according to a sinusoidal function, forming multiple fail-fuse points 222 along length 218. In another embodiment, nose length 220 can vary according to radial distance from fan blade tip 202. In another embodiment, nose length 220 can vary by step function where nose length 220 is constant at a first length for a first radial distance. Nose length 220 is then reduced to a second length for a second radial distance. Nose length 220 returns to the first length for a third radial distance. In another embodiment, nose length 220 can vary randomly along length 218, forming multiple fail-fuse points 222 along length 218.

As described above, during normal operations, rotation of fan blade 200 directs air into bypass airflow passage 156 and into core air flowpath 137. During a fan blade out event, fan blade 200 breaks loose from disk 142 and flies into nacelle 150, fan casing 149, other fan blades 140, and other parts of gas turbine engine 110. Exemplary embodiments of fan blade 200 described herein are designed to break apart at fail-fuse points 222 during extreme loading conditions, such as a fan blade out event, reducing the damage to fan casing 149, nacelle 150, other fan blades 140, and other parts of gas turbine engine 110.

FIG. 3 is a cutaway view of metal leading edge 208 at a non-fail-fused point 224 3-3. Metal leading edge 208 includes a nose 302, a pressure side bond edge 304, and a suction side bond edge 306. Nose 302 extends from fan blade body 204 in the direction of rotation of fan blade 200. Pressure side bond edge 304 and suction side bond edge 306 extend from nose 302 along fan blade body 204 in the opposite direction of rotation of fan blade 200. A non-fail-fused notch 308 is formed from the conjunction of nose 302, pressure side bond edge 304, and suction side bond edge 306. Nose 302 includes a nose tip 310 and a non-fail-fused nose length 312. Non-fail-fused nose length 312 extends from nose tip 310 to notch 308.

FIG. 4 is a cutaway view of metal leading edge 208 at a fail-fused point 222 4-4. At fail-fuse point 222 4-4, metal leading edge 208 includes a fail-fused notch 402 and a fail-fused nose length 404. Fail-fused notch 402 is milled to extend further into nose 302 than non-fail-fused notch 308 extended into nose 302. Accordingly, fail-fused nose length 404 is shorter than non-fail-fused nose length 312. A shorter fail-fuse nose length 404 weakens nose 302 at fail-fuse point 222 4-4 allowing metal leading edge 208 to break during extreme loading conditions, such as a fan blade out event, reducing the damage to fan case 149. Metal leading edge 208 includes a plurality of fail fuse points 222 to weaken metal leading edge 208 at multiple points along length 218.

Figure 5:
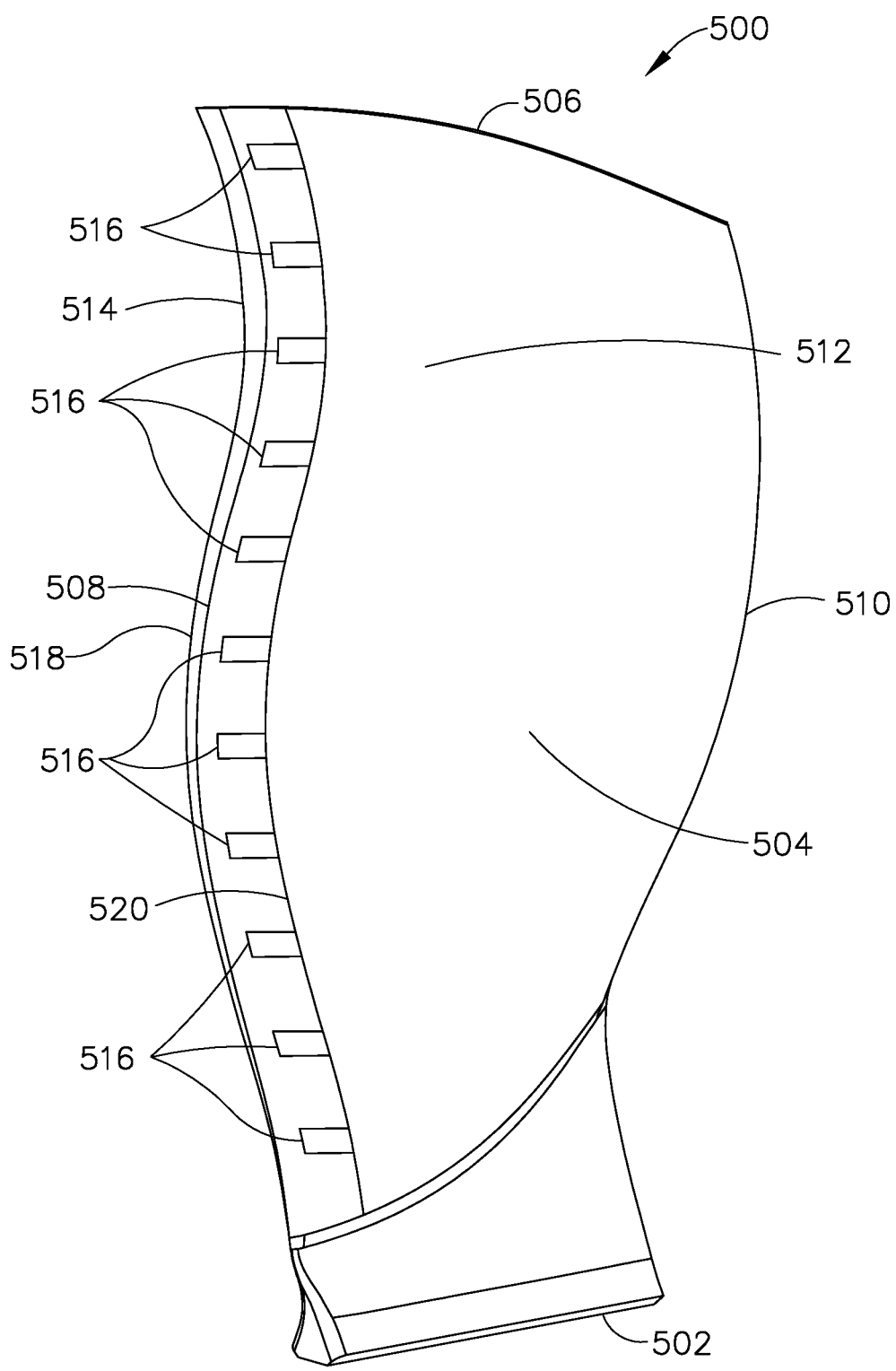

FIG. 5 is a perspective view of a fan blade 500. Fan blade 500 includes a fan blade root 502, a fan blade body 504, a fan blade tip 506, a metal leading edge 508, and a trailing edge 510. Fan blade body 504 extends from fan blade root 502 in radial direction R to fan blade tip 506 and is formed of a single piece. Fan blade body 504 includes an airfoil shaped blade metallic or composite blade. Fan blade body 504 and metal leading edge 508 include a suction side 512 and a pressure side 514. Metal leading edge 508 is adhesively bonded to fan blade body 504 and wraps partially around fan blade body 504 in the direction of rotation of fan blade 500. Trailing edge 510 extends from fan blade body 504 in the opposite direction of rotation of fan blade 500.

Metal leading edge 508 includes a plurality of notches 516, a nose 518, a suction side bond edge 520, and a pressure side bond edge (not shown on FIG. 5). Suction side bond edge 520 and pressure side bond edge extend from nose 518 along fan blade body 504 in the opposite direction of rotation of fan blade 500. Each notches of the plurality of notches 516 a cut out extending from the edge of suction side bond edge 520 and pressure side bond edge toward nose 518. Each notch of the plurality of notches 516 is sized to break during extreme loading conditions, such as a fan blade out event, reducing the damage to fan case 149.

Figure 6:
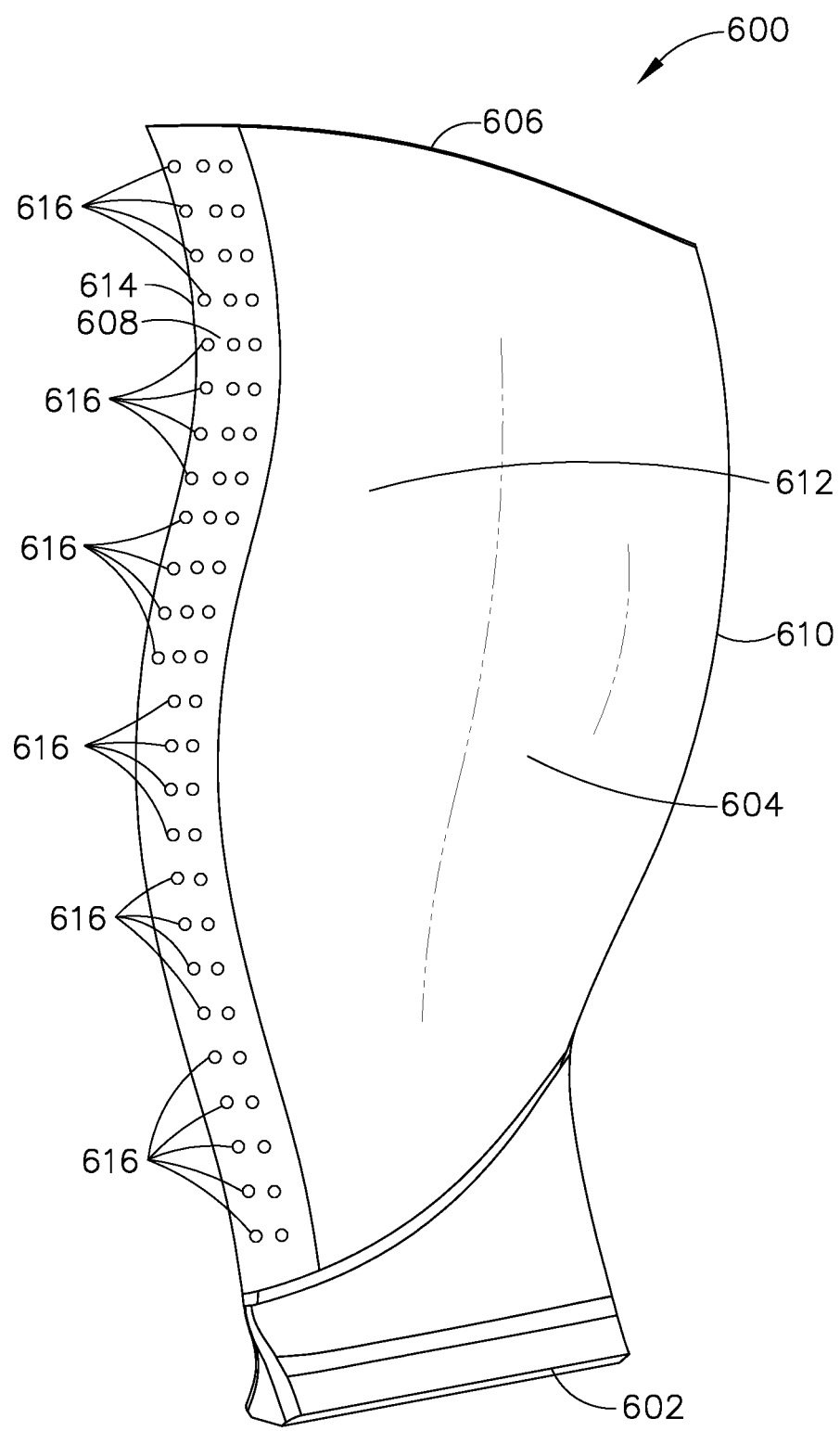

FIG. 6 is a perspective view of a fan blade 600 with holes. Fan blade 600 includes a fan blade root 602, a fan blade body 604, a fan blade tip 606, a metal leading edge 608, and a trailing edge 610. Fan blade body 604 extends from fan blade root 602 in radial direction R to fan blade tip 606. Fan blade body 604 includes an airfoil shaped blade metallic or composite blade. Fan blade body 604 and metal leading edge 608 include a suction side 612 and a pressure side 614. Metal leading edge 608 is adhesively bonded to fan blade body 604 and wraps partially around fan blade body 604 in the direction of rotation of fan blade 600. Trailing edge 610 extends from fan blade body 604 in the opposite direction of rotation of fan blade 600.

Metal leading edge 608 includes a plurality of holes 616, a nose 618, a suction side bond edge 620, and a pressure side bond edge (not shown on FIG. 6). Suction side bond edge 620 and pressure side bond edge extend from nose 618 along fan blade body 604 in the opposite direction of rotation of fan blade 600. Plurality of holes 616 are cut into suction side bond edge 620 and pressure side bond edge and weaken metal leading edge 608 such that it breaks during extreme loading conditions, such as a fan blade out event, reducing the damage to fan case 149.

FIG. 7 is a perspective view of a metal leading edge 700 with a weakened inner pressure and suction side bond edge. FIG. 8 is a partial end view of metal leading edge 700 with a weakened inner pressure and suction side bond edge. Metal leading edge 700 includes a nose 702, a pressure side bond edge 704, and a suction side bond edge 706. Nose 702 extends from fan blade body 204 (shown in FIG. 2) in the direction of rotation of fan blade 200 (shown in FIG. 2). Pressure side bond edge 704 and suction side bond edge 706 extend from nose 702 along fan blade body 204 in the opposite direction of rotation of fan blade 200. A non-fail-fused notch 708 is formed from the conjunction of nose 702, pressure side bond edge 704, and suction side bond edge 706. Pressure side bond edge 704 includes a pressure side bond edge inner surface 710 and suction side bond edge 706 includes a suction side bond edge inner surface 712. Metal leading edge 700 includes a plurality of milled notches 714 cut into pressure and suction side bond edge inner surfaces 710 and 712. Milled notches 714 are milled into suction side bond edge inner surface 712 and pressure side bond edge inner surface 710 and weaken metal leading edge 700 such that it breaks during extreme loading conditions, such as a fan blade out event, reducing the damage to fan case 149 (shown in FIG. 1).

The metal leading edge provides an efficient method for reducing the damage caused by fan blades during fan blade out events. Specifically, the metal leading edge breaks during extreme loading conditions, such as fan blade out conditions, reducing the damage to the fan casing, nacelle, other fan blades, and other parts of gas turbine engine. Accordingly, the armoring of the fan casing can be reduced which reduces the weight of gas turbine engine. Finally, the metal leading edge described herein reduces damage to other fan blades during a fan blade out event which reduces unbalance and loading during fan blade out events.

An exemplary technical effect of the methods, systems, and apparatus described herein includes at least one of: (a) reducing damage caused by fan blades during fan blade out events; (b) reducing damage to other fan blades during a fan blade out event; (c) reducing unbalance and loading during fan blade out events; and (d) decreasing the weight of the aircraft engine.

Exemplary embodiments of the metal leading edge are described above in detail. The metal leading edge, and methods of operating such units and devices are not limited to the specific embodiments described herein, but rather, components of systems and/or steps of the methods may be utilized independently and separately from other components and/or steps described herein. For example, the methods may also be used in combination with other systems for reducing the damage caused by fan blades during fan blade out events, and are not limited to practice with only the systems and methods as described herein. Rather, the exemplary embodiment may be implemented and utilized in connection with many other machinery applications that require metal leading edges.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A metal leading edge protecting apparatus configured to engage a complementary leading edge of a composite blade member, said apparatus comprising:
    a nose member, a first integrally-formed edge portion extending away from said nose member, and a second integrally-formed edge portion extending away from said nose member, wherein the nose member includes a nose tip and has a nose length measured from the nose tip to the notch;
    wherein the apparatus includes a plurality of fail-fused points and non-fail-fused points located periodically along the length of the apparatus, the fail-fused points comprising a plurality of spaced-apart notches of said first integrally-formed edge portion and said second integrally-formed edge portion, said notches being spaced along the length of the airfoil body and extending from an edge of the first integrally-formed edge portion across the nose member and to an edge of the second integrally-formed edge portion so as to create weakened areas at the fail-fused points such that a first notch defines a first nose length and a second notch defines a second nose length and a third notch defines a third nose length and the first nose length is different from the second and third nose length and the second nose length is different from the third nose length.

2. The apparatus of claim 1, wherein a length from a tip of the nose member to each of the notches is less than a length from the tip of the nose member to the edge of the first integrally-formed edge portion.

3. The apparatus of claim 1, wherein the apparatus is configured to adhesively bond to a composite blade member.

4. The apparatus of claim 1, wherein said apparatus comprises titanium.

5. The apparatus of claim 1, wherein said apparatus comprises steel.

6. A fan blade assembly comprising:
a fan blade airfoil body comprising a length and a leading edge; and
a metal leading edge protecting apparatus comprising:
a nose member, a first integrally-formed edge portion extending away from said nose member, and a second integrally-formed edge portion extending away from said nose member and the nose member includes a nose tip and has a nose length measured from the nose tip to the notch;
wherein the apparatus includes a plurality of fail-fused points and non-fail-fused points located periodically along the length of the apparatus, the fail-fused points comprising a plurality of spaced-apart notches of said first edge portion and said second edge portion, said notches being spaced along the length of the airfoil body, wherein each of the notches is cutout from an edge of the first integrally-formed edge portion across the nose member and to an edge of the second-integrally formed edge portion so as to create weakened areas at the fail-fused points such that a first notch defines a first nose length and a second notch defines a second nose length and a third notch defines a third nose length and the first nose length is different from the second and third nose length and the second nose length is different from the third nose length.

7. The fan blade assembly of claim 6, wherein said plurality of spaced-apart notches are rectangular cutaway sections.

8. The fan blade assembly of claim 6, wherein said metal leading edge protecting apparatus comprises titanium.

9. The fan blade assembly of claim 6, wherein said metal leading edge protecting apparatus comprises steel.

10. A fan blade comprising:
a fan blade root, a fan blade tip, and an airfoil body extending axially therebetween, said airfoil body comprises an axially-spaced leading edge and an axially-spaced trailing edge, said airfoil body comprises a length extending between said fan blade root and said fan blade tip;
a metal leading edge protecting apparatus comprising:
a nose member, a first integrally-formed edge portion extending away from said nose member, and a second integrally-formed edge portion extending away from said nose member, said first edge portion and said second edge portion forming a non-fail fused notch at a conjunction of said first edge portion, said second edge portion, and said nose member, wherein the nose member includes a nose tip and has a nose length measured from the nose tip to the non-fail fused notch;
a plurality of notches formed into an inner surface of the first integrally-formed edge portion and an inner surface of the second integrally-formed edge portion so as to create weakened areas in the metal leading edge protecting apparatus to permit the metal leading edge apparatus to break during loading conditions such that a first notch defines a first nose length and a second notch defines a second nose length and a third notch defines a third nose length and the first nose length is different from the second and third nose length and the second nose length is different from the third nose length.

11. The fan blade of claim 10, wherein said non-fail fused notch is configured to adhesively bond to said axially-spaced leading edge of said airfoil body.

12. The fan blade of claim 10, wherein said metal leading edge protecting apparatus comprises titanium.

13. The fan blade of claim 10, wherein said metal leading edge protecting apparatus comprises steel.

14. The fan blade of claim 10, wherein each of the plurality of notches extend from an edge of the first integrally-formed edge portion to an edge of the second integrally-formed edge portion.

15. The fan blade of claim 10, wherein each of the plurality of notches is spaced from an adjacent one of the plurality of notches such that the plurality of notches are spaced-apart along a length of the fan blade from fan blade root to fan blade tip.

* * * * *